US012696308B2

(12) United States Patent
Yue et al.

(10) Patent No.: US 12,696,308 B2
(45) Date of Patent: Jul. 28, 2026

(54) SUPPORT OF UL SDT DURING MT SDT

(71) Applicant: LENOVO (BEIJING) LIMITED, Beijing (CN)

(72) Inventors: Ran Yue, Beijing (CN); Lianhai Wu, Beijing (CN); Jie Hu, Beijing (CN); Jie Shi, Beijing (CN); Jing Han, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 353 days.

(21) Appl. No.: 18/684,514

(22) PCT Filed: Aug. 19, 2021

(86) PCT No.: PCT/CN2021/113455
§ 371 (c)(1),
(2) Date: Feb. 16, 2024

(87) PCT Pub. No.: WO2023/019500
PCT Pub. Date: Feb. 23, 2023

(65) Prior Publication Data
US 2024/0430940 A1      Dec. 26, 2024

(51) Int. Cl.
*H04W 72/563*        (2023.01)
*H04W 74/0833*      (2024.01)

(52) U.S. Cl.
CPC ...... *H04W 72/563* (2023.01); *H04W 74/0833* (2013.01)

(58) Field of Classification Search
CPC ........... H04W 52/02; H04W 68/00–12; H04W 72/563; H04W 74/0833; H04W 74/0836;
(Continued)

(56) References Cited

U.S. PATENT DOCUMENTS 12,389,462 B2 *   8/2025  Lin .................. H04W 74/0833
2014/0016614 A1 *  1/2014  Velev ................... H04W 76/10
                                                        370/331
(Continued)

FOREIGN PATENT DOCUMENTS

CN          110366208  A        10/2019
CN          113543311  A  *  10/2021   .......... H04W 68/005
(Continued)

OTHER PUBLICATIONS

Zhang et al., "Control Method of Wireless Resource Control State of User Equipment and Related Device," English machine translation of CN 113543311-A, Clarivate Analytics, pp. 1-58 (Year: 2026).*
(Continued)

*Primary Examiner* — Thomas R Cairns
(74) *Attorney, Agent, or Firm* — AMPACC Law Group, PLLC

(57)                ABSTRACT

Methods and apparatuses for support of UL SDT during MT SDT are disclosed. A method performed by a terminal device in a non Radio Resource Control (RRC)_CONNECTED state with a network device comprises receiving a paging for Mobile Terminating (MT) Small Data Transmission (SDT) from the network device; and determining whether to stop the MT SDT or not when uplink (UL) data expected to be transmitted by an Mobile Originating (MO) SDT arrives before the MT SDT completes.

20 Claims, 8 Drawing Sheets

(58) Field of Classification Search
CPC .. H04W 74/0838; H04W 76/10; H04W 76/27
See application file for complete search history.

(56) References Cited

U.S. PATENT DOCUMENTS

| 2016/0113057 | A1* | 4/2016 | Haneji | ................ | H04W 76/25 |
| | | | | | 370/328 |
| 2023/0040675 | A1* | 2/2023 | Gupta | .................. | H04W 76/27 |
| 2023/0224997 | A1* | 7/2023 | Agiwal | ............ | H04W 72/1268 |
| 2025/0048336 | A1* | 2/2025 | Agiwal | ................ | H04W 72/04 |

FOREIGN PATENT DOCUMENTS

| EP | 3651503 | A1 | 5/2020 |
| WO | 2020222520 | A1 | 11/2020 |
| WO | 2020223633 | A1 | 11/2020 |
| WO | 2020252795 | A1 | 12/2020 |
| WO | 2021147006 | A1 | 7/2021 |

OTHER PUBLICATIONS

ZTE Corporation et al. "Consideration on the RACH based SDT" 3GPP TSG-RAN WG2 #13e eMeeting, R2-2101159, Feb. 5, 2021; pp.

ZTE Corporation et al. "Open issues for RACH based SDT" 3GPP TSG-RAN WG2 #114 eMeeting, R2-2105929, May 27, 2021; pp. 1-16.

International Search Report and Written Opinion dated Apr. 26, 2022 for International Application No. PCT/CN2021/113455.

The Extended European Search Report for European Patent Application No. 21953747.9, dated Mar. 18, 2025.

Qualcomm Incorporated "Discussion on reply LS from SA2 on MT-EDT," 3GPP TSG-RAN WG2 Meeting #108; R2-1915718; Nov. 22, 2019; 3 pages.

* cited by examiner

200

400

Start

410 — UE receives paging for DL MT SDT, and a RACH for MT SDT procedure is initiated to respond to the DL MT SDT 420 — UL SDT data arrives 430 — RRC Release message with SuspendConfig is received by the UE before the UL SDT data is transmitted 440 — a new BSR is triggered 450 — BSR can be assembled or transmitted in the PDU of the UL MO SDT End

SUPPORT OF UL SDT DURING MT SDT

CROSS REFERENCE TO RELATED APPLICATIONS

This application is a national phase entry of International Application No. PCT/CN2021/113455, filed on Aug. 19, 2021, which is incorporated by reference in its entirety

FIELD

The subject matter disclosed herein generally relates to wireless communications, and more particularly relates to methods and apparatuses for support of UL SDT during MT SDT.

BACKGROUND

The following abbreviations are herewith defined, at least some of which are referred to within the following description: New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), User Equipment (UE), Evolved Node B (eNB), Next Generation Node B (gNB), Uplink (UL), Downlink (DL), Central Processing Unit (CPU), Graphics Processing Unit (GPU), Field Programmable Gate Array (FPGA), Orthogonal Frequency Division Multiplexing (OFDM), Radio Resource Control (RRC), User Entity/Equipment (Mobile Terminal), Transmitter (TX), Receiver (RX), small data transmission (SDT), configured grant (CG), CG based SDT (CG-SDT), random access channel (RACH), RACH based SDT (RA-SDT), Reference Signal Received Power (RSRP), Mobile originate (MO), Mobile terminated (MT), Medium Access Control (MAC), packet data convergence protocol (PDCP), radio link control (RLC), service data unit (SDU), protocol data unit (PDU), radio bearer (RB), buffer status report (BSR).

There are two RRC states for 4G LTE: RRC_IDLE and RRC_CONNECTED. 5G NR introduces a new RRC state, RRC_INACTIVE. Therefore, in 5G NR, RRC has three distinct states: RRC_IDLE, RRC_CONNECTED and RRC_INACTIVE.

NR Release 17 supports direct transmission of small data transmission (SDT) in the RRC_INACTIVE state.

A current SDT procedure is described as follows. A SDT configuration (e.g. CG based SDT (CG-SDT) configuration) has been configured to the UE when the UE is released to RRC_INACTIVE state. Several CG occasions for SDT (e.g. CG resources) are configured in the CG-SDT configuration. Alternatively, several CG configurations for SDT are configured. When SDT data arrives, the UE initiates the selection between SDT and non-SDT, also between CG-SDT procedure and RACH based SDT (RA-SDT) procedure if SDT is selected. In particular, if CG-SDT criteria are met, UE selects CG-SDT and initiate SDT procedure; else if RA-SDT criteria are met: UE selects RA-SDT and initiate SDT procedure; else, UE initiates non-SDT procedure. CG-SDT criteria are considered met, if 1) available data volume<=data volume threshold and 2) RSRP is greater than or equal to a configured threshold. RA-SDT criteria is considered met, if 1) available data volume<=data volume threshold; 2) RSRP is greater than or equal to a configured threshold; and 3) 4-step RA-SDT resources are configured on the selected UL carrier and criteria to select 4 step RA-SDT is met; or 2-step RA-SDT resources are configured on the selected UL carrier and criteria to select 2 step RA-SDT is met.

A 4 step RACH procedure (that can be used as RA-SDT) comprises: UE transmits a preamble (Msg1) on PRACH to a network device (e.g. gNB)), the network device transmits a response (Msg2) to the preamble) the UE transmits uplink information (Msg3) according to the response, and the network device transmits a contention resolution message (Msg4) according to the uplink information. A 2-step RACH procedure (that can be used as RA-SDT) comprises the transmission of MsgA and MsgB, wherein MsgA corresponds to a combination of Msg1 and Msg3 and MsgB corresponds to a combination of Msg2 and Msg4. It can be seen that RA-SDT (4-step RA-SDT or 2-step RA-SDT) allows SDT to use an uplink grant received via a random access procedure for SDT.

On the other hand, CG-SDT allows SDT to use a configured grant without performing a random access procedure.

The above-described SDT can be referred to as UL (uplink) SDT. In addition, the above-described SDT is initiated by the UE, which can be referred to as MO (Mobile originate) SDT.

In the MO SDT initiated by the UE, a network device (e.g. gNB) can also transmit DL data (e.g. small data). Such DL small data transmission can be referred to as DL SDT. In addition, MT (Mobile terminated) SDT that is initiated by the gNB will be supported.

An MT SDT procedure is initiated by the network device (e.g. gNB) for a downlink (DL) data transmission. Upon arrival of downlink (DL) data, if the size of the DL data meets certain criteria, the gNB will send a paging message including e.g. mt-SDT to the UE. The UE responds by initiating a RACH (RACH for MT SDT) procedure.

Considering the following scenario: CG-SDT is configured to the UE before the paging for MT SDT (e.g. DL MT SDT) is received by the UE. Afterwards, UL SDT data (that is expected to be transmitted by CG-SDT) arrives before the MT SDT initiated for DL data transmission completes. How does not UE handle the parallel UL SDT procedure and DL SDT procedure?

Considering another scenario: paging for MT SDT (e.g. DL MT SDT) is received by the UE; then, a RACH for MT SDT is initiated to respond to the paging. The DL data transmission initiated by MT SDT has not been completed before UL SDT data (that is expected to be transmitted by RA-SDT) arrives. Should the UE continue to receive the DL data transmission or initiate a MO SDT (e.g. RA-SDT) for the UL SDT data?

This invention targets the above issues.

BRIEF SUMMARY

Methods and apparatuses for support of UL SDT during MT SDT are disclosed.

In one embodiment, a method performed by a terminal device in a non Radio Resource Control (RRC)_CONNECTED state with a network device comprises receiving a paging for Mobile Terminating (MT) Small Data Transmission (SDT) from the network device; and determining whether to stop the MT SDT or not when uplink (UL) data expected to be transmitted by an Mobile Originating (MO) SDT arrives before the MT SDT completes. The MT SDT may be initiated for a DL data transmission from the network device to the terminal device.

In one embodiment, the method may further comprise initiating a UL MO SDT for the UL data; and stopping the MT SDT. Alternatively, the method may further comprise initiating a UL MO SDT for the UL data; and stopping the MT SDT when the UL data is transmitted by the UL MO SDT.

In another embodiment, each of the MT SDT and the UL MO SDT is associated with a priority. The method may further comprise initiating a UL MO SDT for the UL data; and stopping the MT SDT when the UL MO SDT has a higher priority than the MT SDT. Each of a priority of the MT SDT and a priority of the UL MO SDT may be determined by the priority of the traffic transmitted therein. Alternatively, each of a priority of the MT SDT and a priority of the UL MO SDT is determined by the highest priority among priorities of the logical channels that there are SDT data or SDT data arrival. The priority of the MT SDT may be indicated in a DL message. Preferably, the priority of the UL MO SDT is configured to be higher than the priority of the MT SDT.

In some embodiment, the method may further comprise initiating a Random Access Channel (RACH) for MT SDT; and setting a resume cause to mo-SDT in Msg3 in the RACH for MT SDT. In some other embodiment, the method may further comprise: when CG-SDT has been configured, responding to the MT SDT by the CG-SDT. In still another embodiment, the method may further comprise transmitting an indication of the arrival of the UL data.

In one embodiment, a method performed by a network device comprises transmitting a paging for MT SDT to a terminal device; and 804 determining whether to stop the MT SDT or not before the MT SDT completes.

In another embodiment, a terminal device (UE) comprises a processor; and a transceiver coupled to the processor, wherein the processor is configured to: receive a paging for MT SDT from a network device via the transceiver; and determine whether to stop the MT SDT or not when UL data expected to be transmitted by an MO SDT arrives before the MT SDT completes.

In yet another embodiment, a network device comprises a processor; and a transceiver coupled to the processor, wherein the processor is configured to: transmit a paging for MT SDT to a terminal device via the transceiver; and determine whether to stop the MT SDT or not before the MT SDT completes.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

Figure 1:
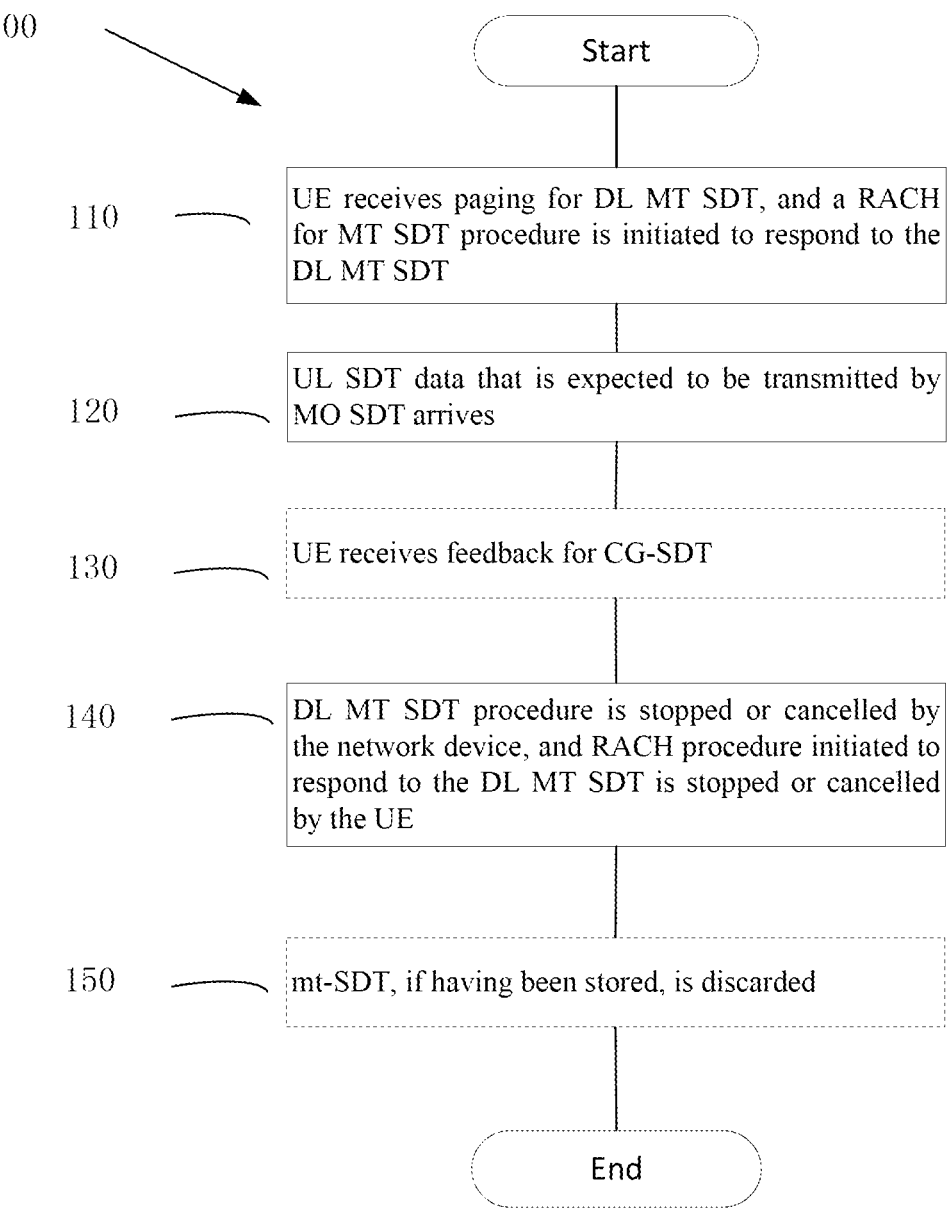
FIG. 1 illustrates a procedure of a first embodiment.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE, 3GPP NR-U, NR Radio Access operating with shared spectrum channel access and so on. It is contemplated that along with the developments of network architectures and new service scenarios, all embodiments in the present application are also applicable to similar technical problems. Moreover, the terminologies recited in the present application may change, which should not affect the principle of the present application. Embodiments of the present disclosure can also be applied to unlicensed spectrum scenario.

SDT can be supported not only in RRC_CONNECTED but also in RRC_INACTIVE state. The RRC_INACTIVE state and the RRC_IDLE state can be collectively referred to as non RRC_CONNECTED state. In the following description, SDT can be performed by a terminal device (e.g. UE) in a non RRC_CONNECTED state.

A first embodiment relates to defining a condition to stop an ongoing SDT (e.g. DL MT SDT) procedure.

A procedure 100 according to the first embodiment is described with reference to FIG. 1.

In step 110, the UE receives the paging for MT SDT (e.g. DL MT SDT initiated for DL data transmission), and a RACH (i.e. RACH for MT SDT) procedure is initiated to respond to the DL MT SDT.

In step 120, before completion of MT SDT, UL SDT data that is expected to be transmitted by MO SDT arrives. Accordingly, a MO SDT is initiated for all or part of the UL SDT data. The MO SDT can be CG-SDT (when CG resources for SDT have been configured and the criteria for CG-SDT are met) or RA-SDT (when RACH resources for SDT have been configured and when the criteria for RA-SDT are met). In addition, it is optional that UL data is transmitted by the MO SDT.

In an optional step 130, if the MO SDT is CG-SDT (i.e. the data is transmitted or decided to be transmitted on the CG resources for SDT), a feedback for the CG-SDT is received. The feedback can be the indication from the network device (e.g. gNB), e.g. an explicit indication of ACK or NACK or an implicit indication. The indication can alternatively be expiry of a preconfigured timer (e.g. configuredGrantTimer) indicating ACK, or expiry of another preconfigured timer (e.g. RetransmissionTimer) indicating NACK. The feedback can alternatively be a timer (e.g. an existing timer or a new timer) starting or restarting.

In step 140, the DL MT SDT procedure is stopped or cancelled by the network device. In addition, the RACH procedure initiated to respond to the DL MT SDT is stopped or cancelled by the UE. Either the stop or cancellation of the DL MT SDT procedure by the network device or the stop or cancellation of the RACH procedure by the UE can be performed earlier.

In an optional step 150, an mt-SDT that is used to identify the procedure for mobile terminating calls in non RRC_CONNECTED state, if having been stored when being received in the paging message, is discarded.

Figure 2:
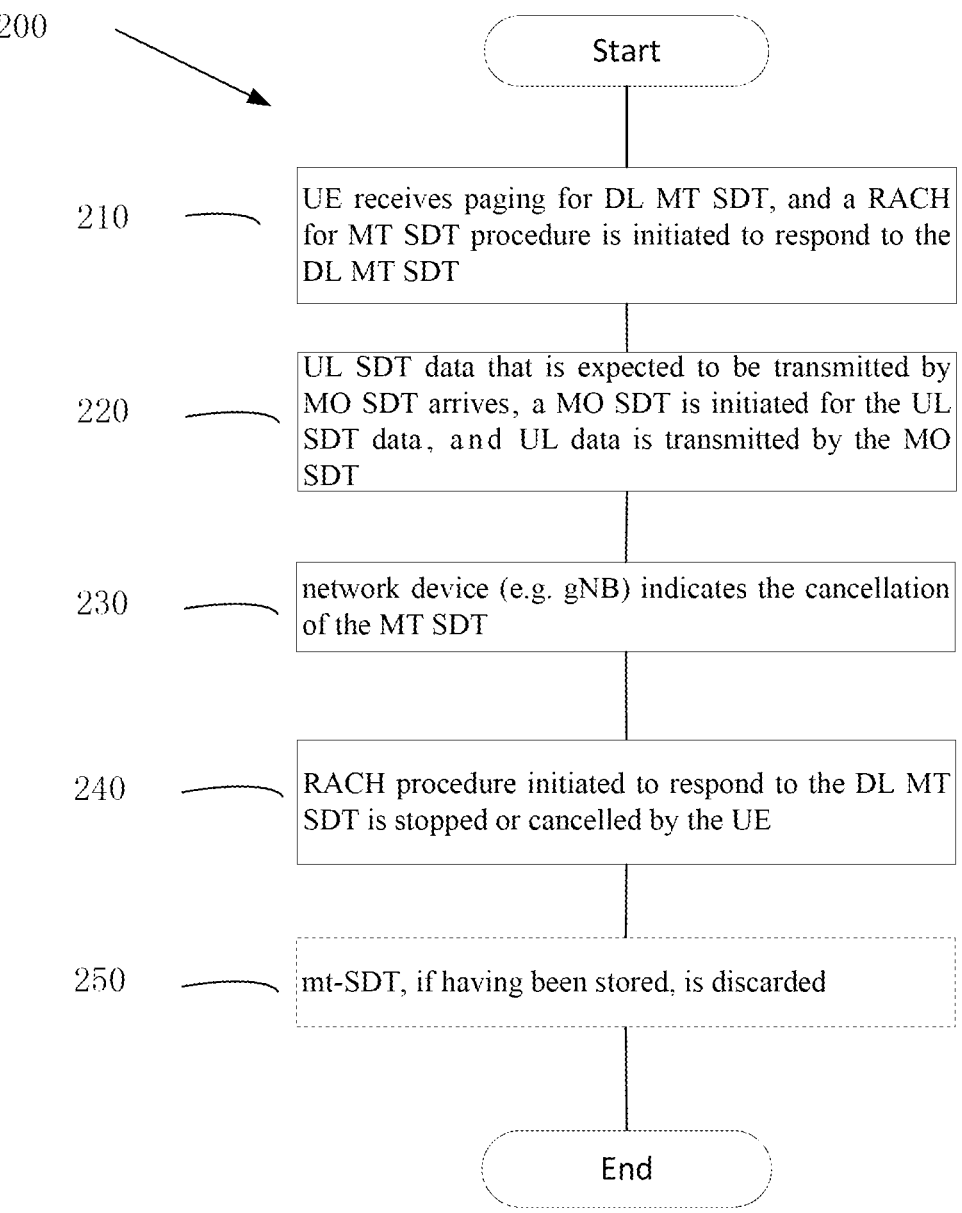
FIG. 2 illustrates a procedure of a variety of the first embodiment.

A procedure 200 according to a variety of the first embodiment is described with reference to FIG. 2.

In step 210, the UE receives the paging for MT SDT (e.g. DL MT SDT initiated for DL data transmission), and a RACH (i.e. RACH for MT SDT) procedure is initiated to respond to the DL MT SDT.

In step 220, before completion of MT SDT, UL SDT data that is expected to be transmitted by MO SDT arrives. Accordingly, a MO SDT is initiated for the UL SDT data. The MO SDT can be CG-SDT or RA-SDT. In addition, UL data is transmitted by the MO SDT.

In step 230, a network device (e.g. gNB) indicates the cancellation of the MT SDT. The indication can be multiplexed with the feedback for the MO SDT. Alternatively, the indication may be a DCI for DL grant or PDSCH. Further alternatively, the indication may be a DL MAC CE or a RRC signaling. Accordingly, the DL MT SDT procedure is stopped or cancelled by the network device.

In step 240, the RACH procedure initiated to respond to the DL MT SDT is stopped or cancelled by the UE.

In an optional step 250, an mt-SDT that is used to identify the procedure for mobile terminating calls in non RRC_CONNECTED state, if having been stored when being received in the paging message, is discarded.

As a whole, according to the first embodiment, a condition is defined to stop the DL MT SDT procedure. The condition can be: a MO SDT for UL SDT data is initiated after the UE receives the paging for DL MT SDT. The condition can alternatively be: all or part of UL data is successfully transmitted by a MO SDT. When the condition is met, the DL MT SDT procedure is cancelled. In addition, the RACH for responding to the paging for the DL MT SDT is stopped.

According to a second embodiment, a priority of the SDT or RACH procedure is defined.

According to a first sub-embodiment of the second embodiment, the priority of the SDT is represented by the priority of the traffic (data or flow or logical channel) transmitted by the SDT. In particular, the priority of the DL MT SDT or UL MO SDT is determined by the highest priority among priorities of the logical channels on which there are SDT data or SDT data arrival or the data to be transmitted. The priority can be configured dedicatedly for SDT, or the same as the existing priority of logical channel. For example, the priority of the DL SDT DRB represents the priority of the DL MT SDT, while the priority of the UL SDT DRB represents the priority of UL MO SDT, if the data for DL SDT is associated with only one logical channel and the data for UL SDT is associated with only one logical channel. As a whole, each of SDTs (e.g. MT SDT or UL MO SDT) is associated with a priority.

The priority of DL MT SDT can be predefined or configured or indicated in the DL message, e.g. indicated in Msg2 or MsgB or Msg4. The indication can be one bit which means high or low.

According to a second sub-embodiment of the second embodiment, the RACH procedure is prioritized. The second sub-embodiment applies when MO SDT for UL data transmission is RA-SDT. For example, the priority of RACH for UL SDT is configured to be higher than the RACH (i.e. RACH for MT SDT) for responding to the MT SDT.

The RACH for UL SDT can be fallback RACH(#1) (RACH based MO SDT fallback to legacy RACH) or RACH(#1) based MO-SDT. The fallback RACH(#1) (RACH based MO-SDT fallback to legacy RACH) or RACH(#1) based MO-SDT can have a priority higher than the priority of RACH(#2) for MT SDT. In this condition, the UL MO SDT or RACH(#1) can interrupt the DL MT SDT or RACH(#2).

In particular, the MAC entity of the UE may stop ra-ResponseWindow for RACH(#2) (i.e. stop monitoring for Random Access Response(s)). Alternatively, the MAC entity of the UE may stop msgB-ResponseWindow for RACH(#2). Further alternatively, the MAC entity of the UE may stop ra-ContentionResolution Timer which is started for RACH(#2).

Incidentally, if the priority of the UL MO SDT or RACH for UL SDT is configured to be lower than the DL MT SDT or RACH for MT SDT, the DL MT SDT or RACH(#2) can interrupt the UL MO SDT or RACH(#1).

Accordingly, after comparing the priorities of the SDTs or RACH procedures, the SDT or RACH procedure with a high priority can stop or interrupt the SDT or RACH procedure with a low priority. It's up to UE implementation which procedure is stopped when the priorities are the same.

In particular, the MAC entity of the UE may stop ra-ResponseWindow for RACH with low priority (i.e. stop monitoring for Random Access Response(s)). Alternatively, the MAC entity of the UE may stop msgB-ResponseWindow for RACH with low priority. Further alternatively, the MAC entity of the UE may stop ra-ContentionResolution-Timer which is started for RACH with low priority.

Incidentally, an mt-SDT that is used to identify the procedure for mobile terminating calls in non RRC_CONNECTED state, if having been stored when being received in the paging message, is discarded.

If there are more than 2 SDTs (e.g. more than one DL MT SDT is triggered and/or more than one MO SDT (for UL SDT) is triggered), the comparison of the priorities can be made among more than two SDTs or more than two RACH procedures.

A third embodiment relates to other procedures in which the DL MT SDT is not stopped even if UL SDT data arrives before completion of DL data transmission by DL MT SDT.

Figure 3:
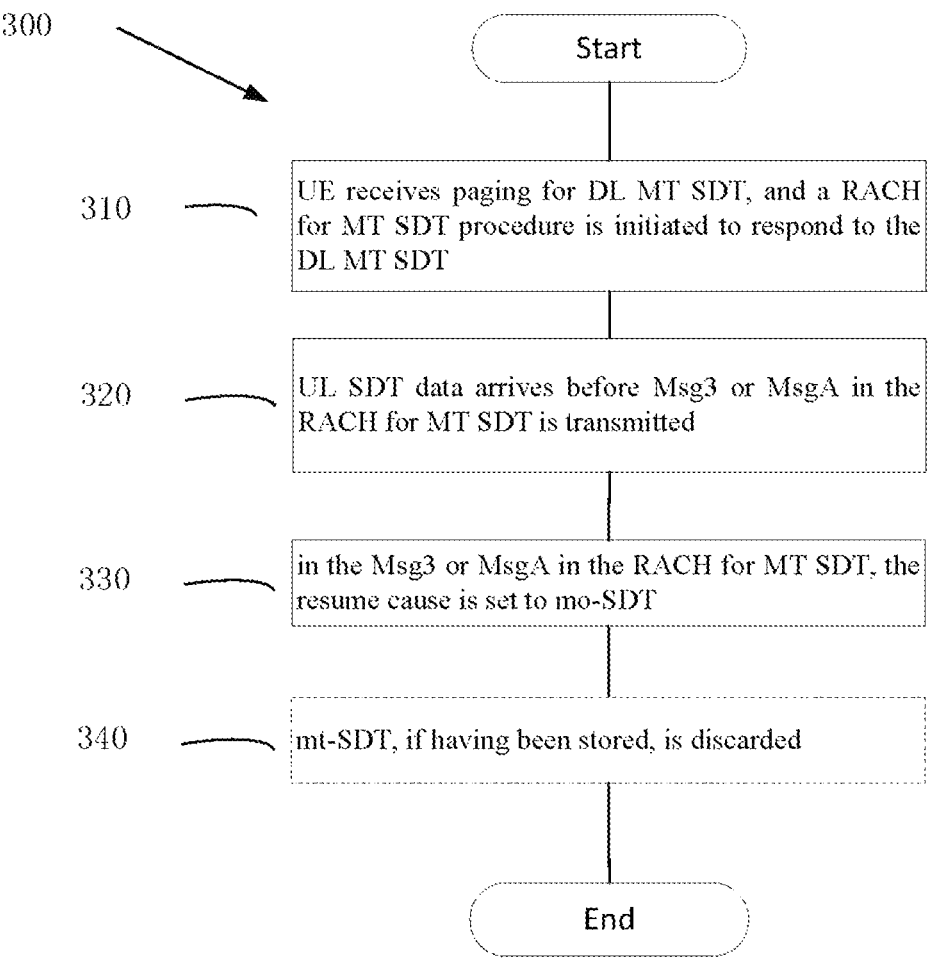
FIG. 3 illustrates a procedure of a first sub-embodiment of a third embodiment.

A procedure 300 according to a first sub-embodiment of the third embodiment is described with reference to FIG. 3.

In step 310, paging for MT SDT (e.g. DL MT SDT initiated for DL data transmission) is received, and a RACH (i.e. RACH for MT SDT) is initiated to respond to the DL MT SDT.

In step 320, UL SDT data arrives before Msg3 or MsgA in the RACH for MT SDT is transmitted.

In step 330, in the Msg3 or MsgA in the RACH for MT SDT, the resume cause is set to mo-SDT. Traditionally, in the Msg3 in the RACH for MT SDT, the resume cause should be set to mt-SDT received in the paging, which means that the RACH is the response to MT SDT. In step 330, when the resume cause is set to mo-SDT, it means that the UE wishes to initiate an MO SDT.

In an optional step 340, the mt-SDT that is used to identify the procedure for mobile terminating calls in non RRC_CONNECTED state, if having been stored when being received in the paging message, is discarded.

Figure 4:
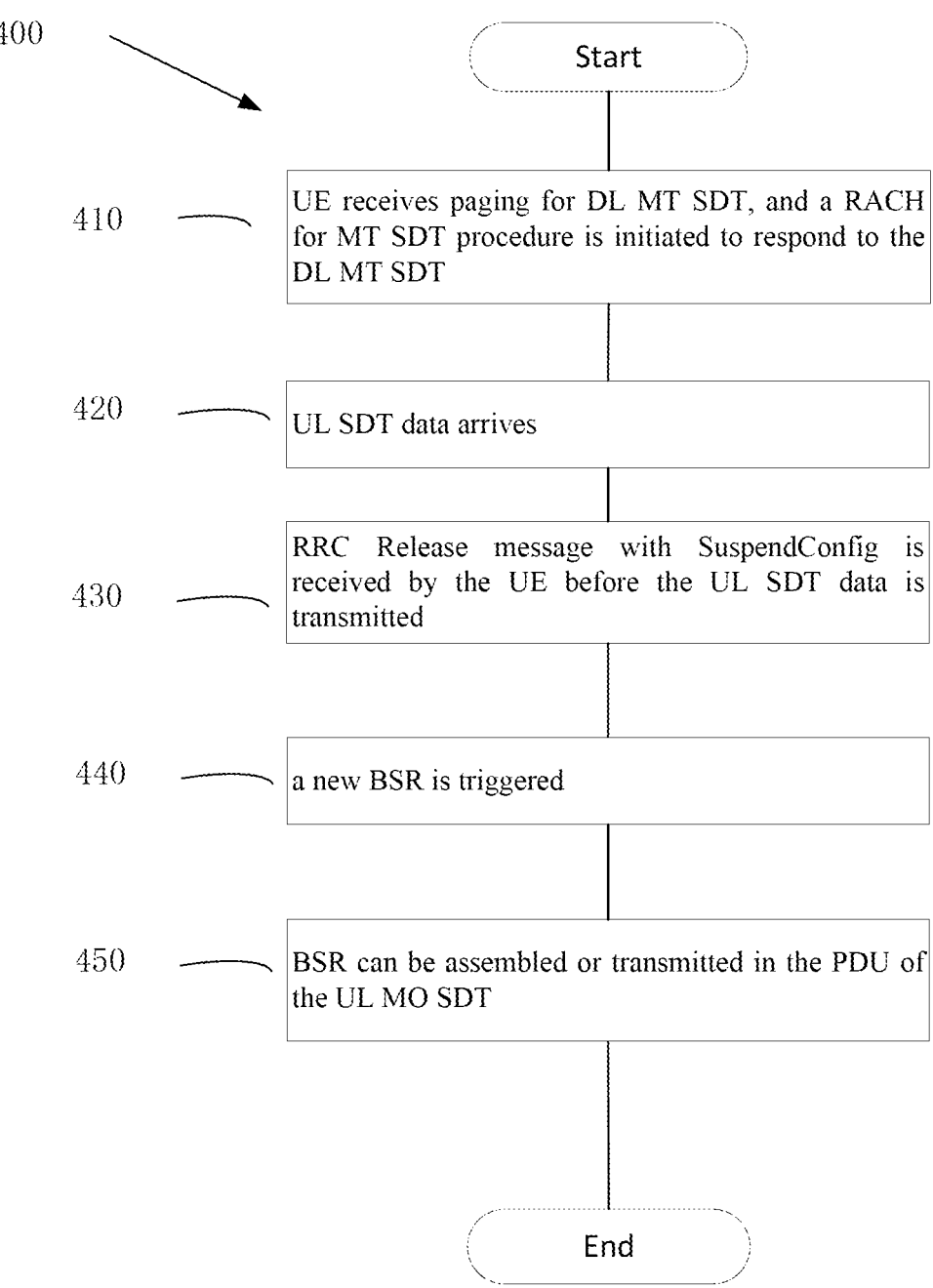
FIG. 4 illustrates a procedure of a second sub-embodiment of the third embodiment.

A procedure 400 according to a second sub-embodiment of the third embodiment is described with reference to FIG. 4.

In step 410, paging for MT SDT (e.g. DL MT SDT initiated for DL data transmission) is received, and, a RACH (i.e. RACH for MT SDT) is initiated to respond to the paging.

In step 420, UL SDT data arrives.

In step 430, RRC Release message with SuspendConfig is received by the UE (which means that the DL data transmission by the MT SDT has completed) before the UL SDT data is transmitted.

In step 440, if there are PDCP and/or RLC SDU and/or PDUs in the buffer corresponding to the configured SDT RBs when initiating an UL MO SDT, a new BSR is triggered.

In step 450, The BSR can be assembled or transmitted in the PDU of the UL MO SDT.

Figure 5:
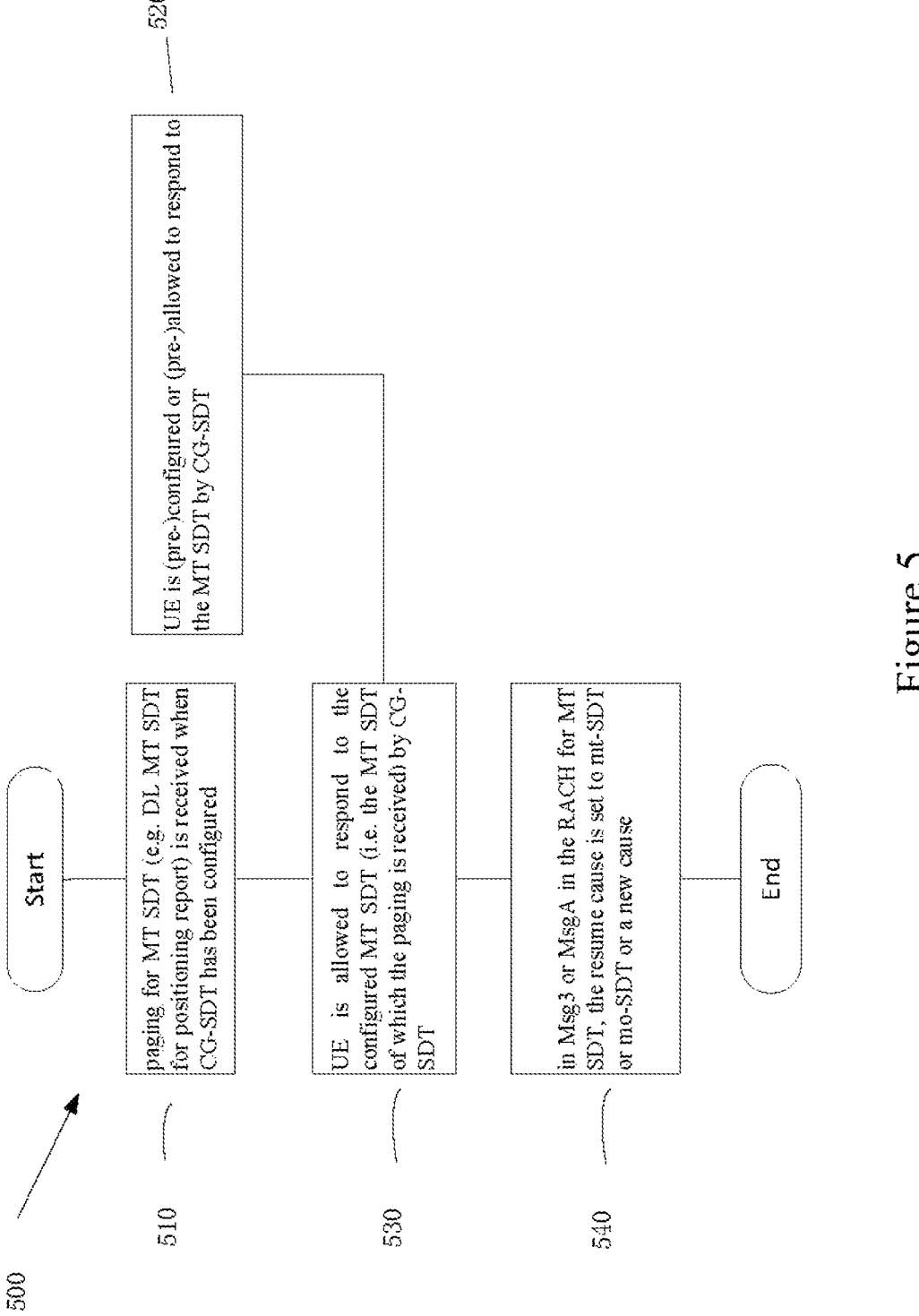
FIG. 5 illustrates a procedure of a third sub-embodiment of the third embodiment.

A procedure according to a third sub-embodiment of the third embodiment is described with reference to FIG. 5.

In step 510, paging for MT SDT (e.g. DL MT SDT initiated for DL data transmission) is received when CG-SDT has been configured. The paging for MT SDT may be for positioning report.

In step 520, the UE is (pre-)configured or (pre-)allowed to respond to the MT SDT by CG-SDT. For example, if the MT SDT can trigger a corresponding MO SDT, then the UE can be allowed to respond to the MT SDT by CG-SDT. This step can be performed before step 510.

In step 530, the UE is allowed to respond to the configured MT SDT (i.e. the MT SDT of which the paging is received) by CG-SDT. For example, the paging is for positioning report. The configured MT SDT can be indicated by a new label e.g. positioning-SDT or specific paging message, etc.

In step 540, in Msg3 or MsgA in the RACH for MT SDT, the resume cause is set to mt-SDT (i.e. the RACH procedure is the response to MT SDT) or mo-SDT (a CG-SDT is initiated if the existing criteria are met) or a new cause (which indicates that the RACH procedure is the response to MT SDT).

Figure 6:
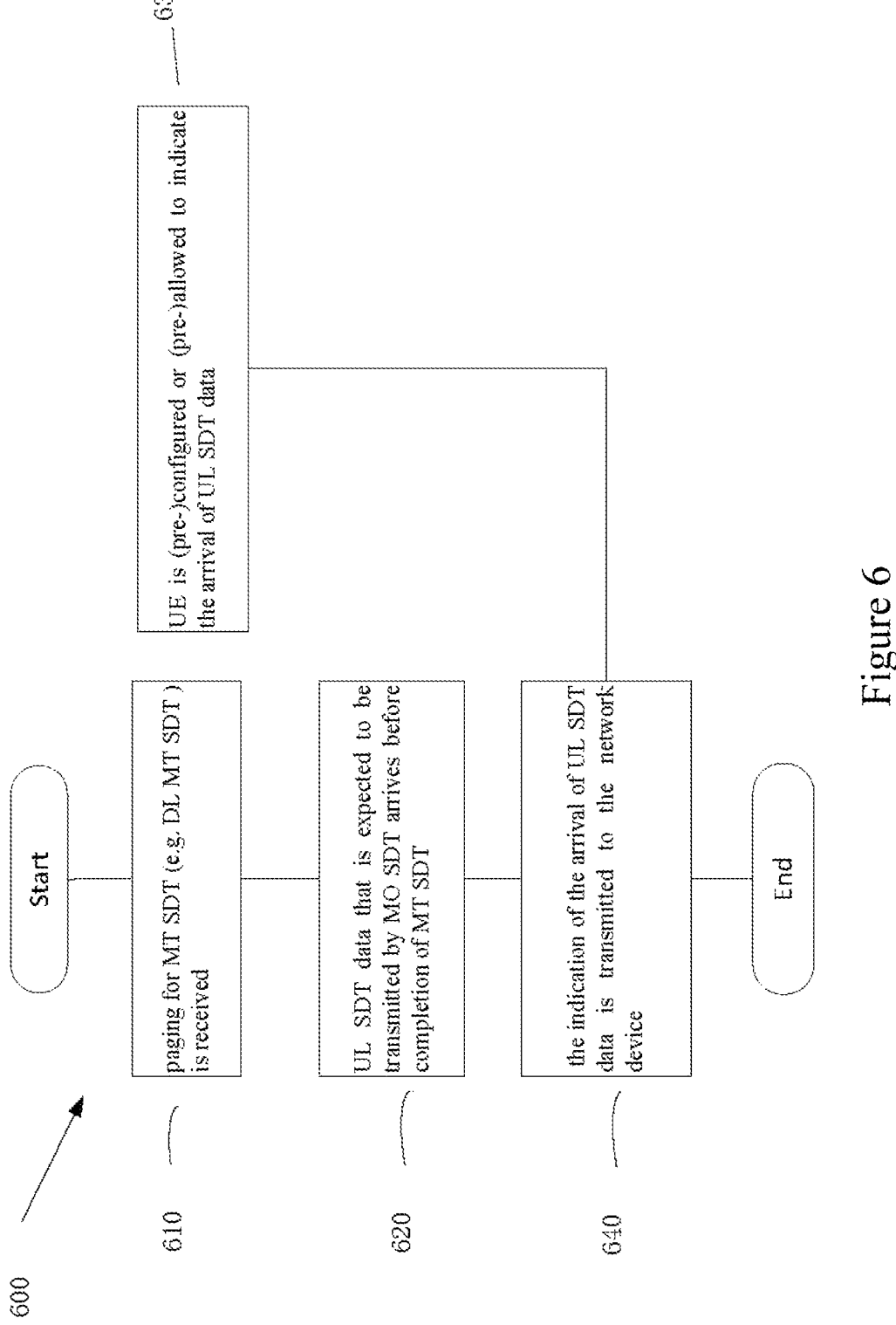
FIG. 6 illustrates a procedure of a fourth sub-embodiment of the third embodiment.

A procedure 600 according to a fourth sub-embodiment of the third embodiment is described with reference to FIG. 6.

In step 610, paging for MT SDT (e.g. DL MT SDT initiated for DL data transmission) is received.

In step 620, before completion of MT SDT, UL SDT data that is expected to be transmitted by MO SDT arrives.

In step 630, the UE is (pre-)configured or (pre-)allowed to indicate the arrival of UL SDT data. This step can be performed before steps 610 and 620.

In step 640, the indication of the arrival of UL SDT data is transmitted to the network device. The transmission can be carried in a UL message during the RACH (i.e. RACH for MT SDT) for responding to the MT SDT.

Figure 7:
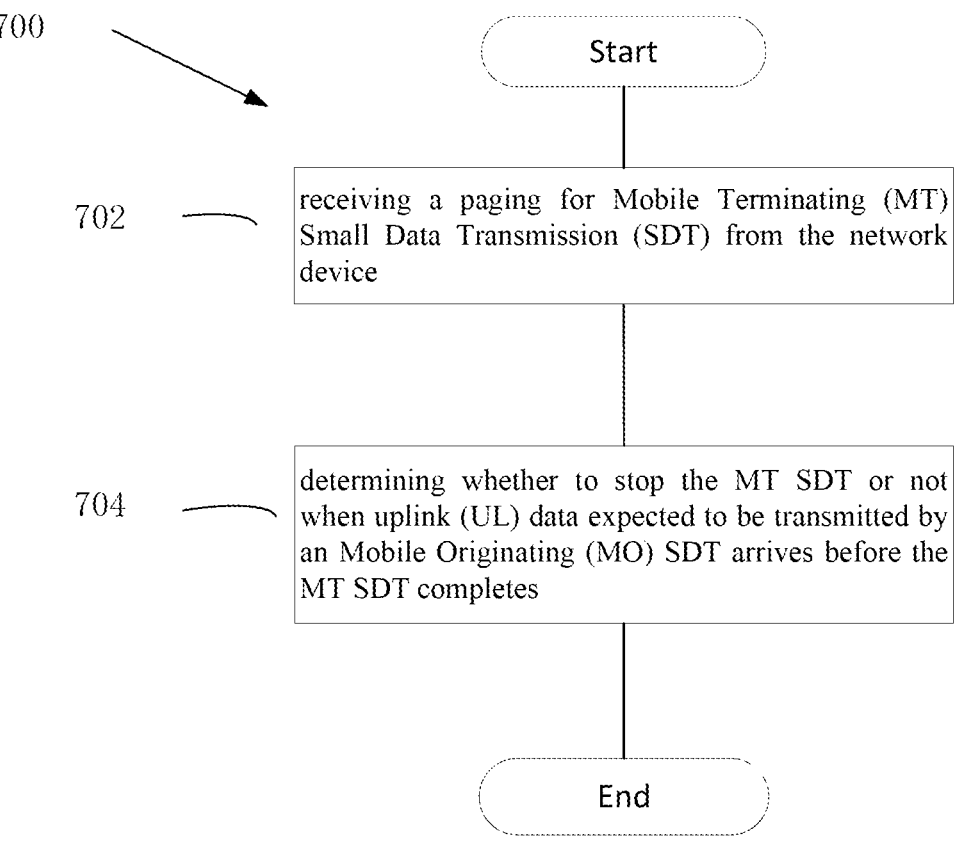
FIG. 7 is a schematic flow chart diagram illustrating an embodiment of a method.

FIG. 7 is a schematic flow chart diagram illustrating an embodiment of a method 700 according to the present application. In some embodiments, the method 700 is performed by an apparatus, such as a remote unit (UE). In certain embodiments, the method 700 may be performed by a processor executing program code, for example, a microcontroller, a microprocessor, a CPU, a GPU, an auxiliary processing unit, a FPGA, or the like.

The method 700 may be performed by a terminal device in a non Radio Resource Control (RRC)_CONNECTED state with a network device, and comprise 702 receiving a paging for Mobile Terminating (MT) Small Data Transmission (SDT) from the network device; and 704 determining whether to stop the MT SDT or not when uplink (UL) data expected to be transmitted by an Mobile Originating (MO) SDT arrives before the MT SDT completes. The MT SDT may be initiated for a DL data transmission from the network device to the terminal device.

The method may further comprise initiating a UL MO SDT for the UL data; and stopping the MT SDT. Alternatively, the method may further comprise initiating a UL MO SDT for the UL data; and stopping the MT SDT when the UL data is transmitted by the UL MO SDT.

In one embodiment, each of the MT SDT and the UL MO SDT is associated with a priority. The method may further comprise initiating a UL MO SDT for the UL data; and stopping the MT SDT when the UL MO SDT has a higher priority than the MT SDT. Each of a priority of the MT SDT and a priority of the UL MO SDT may be determined by the priority of the traffic transmitted therein. Alternatively, each of a priority of the MT SDT and a priority of the UL MO SDT is determined by the highest priority among priorities of the logical channels that there are SDT data or SDT data arrival. The priority of the MT SDT may be indicated in a DL message. Preferably, the priority of the UL MO SDT is configured to be higher than the priority of the MT SDT.

In some embodiment, the method may further comprise initiating a Random Access Channel (RACH) for MT SDT;

and setting a resume cause to mo-SDT in Msg3 in the RACH for MT SDT. In some other embodiment, the method may further comprise: when CG-SDT has been configured, responding to the MT SDT by the CG-SDT. In still another embodiment, the method may further comprise transmitting an indication of the arrival of the UL data.

Figure 8:
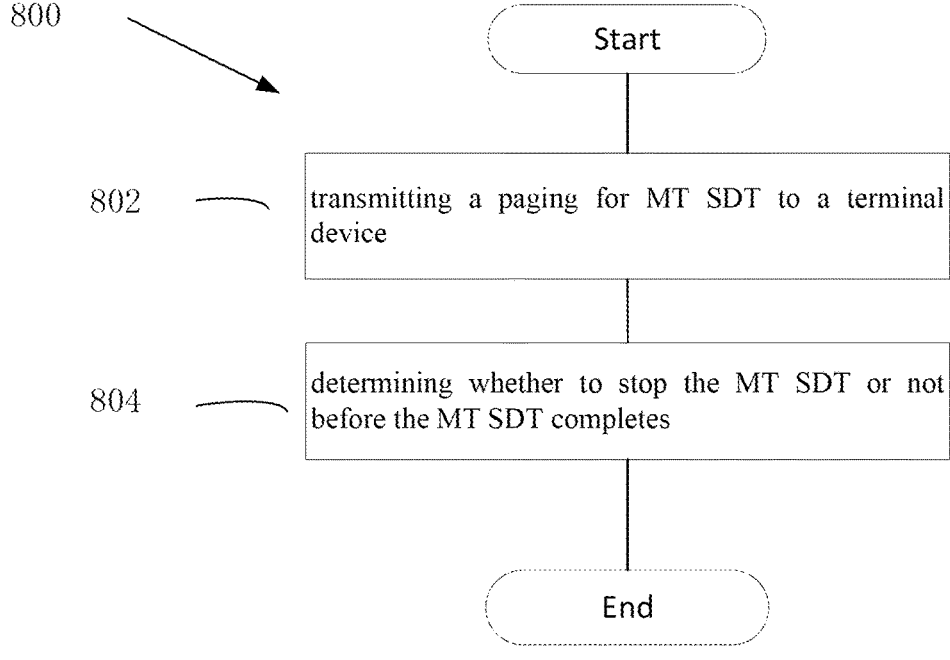
FIG. 8 is a schematic flow chart diagram illustrating a further embodiment of a method.

FIG. 8 is a schematic flow chart diagram illustrating a further embodiment of a method 800 according to the present application. In some embodiments, the method 800 is performed by an apparatus, such as a base unit. In certain embodiments, the method 800 may be performed by a processor executing program code, for example, a micro-controller, a microprocessor, a CPU, a GPU, an auxiliary processing unit, a FPGA, or the like.

The method 800 may be performed by a network device and comprise 802 transmitting a paging for MT SDT to a terminal device; and 804 determining whether to stop the MT SDT or not before the MT SDT completes. The MT SDT may be initiated for a DL data transmission from the network device to the terminal device.

The method may further comprise stopping the MT SDT when receiving an indication that an MO SDT is initiated. Alternatively, the method may further comprise stopping the MT SDT when receiving UL data by an MO SDT.

In one embodiment, each of the MT SDT and an UL MO SDT is configured with a priority. Each of a priority of the MT SDT and a priority of the UL MO SDT is determined by the priority of the traffic transmitted therein. Alternatively, each of a priority of the MT SDT and a priority of the UL MO SDT is determined by the highest priority among priorities of the logical channels that there are SDT data or SDT data arrival. The priority of the MT SDT is indicated in a DL message. Preferably, the priority of the UL MO SDT is configured to be higher than the priority of the MT SDT.

In some embodiment, the method may further comprise receiving a Msg3 in which a resume cause is set to mo-SDT. In some other embodiment, the method may further comprise receiving an indication of arrival of UL data.

Figure 9:
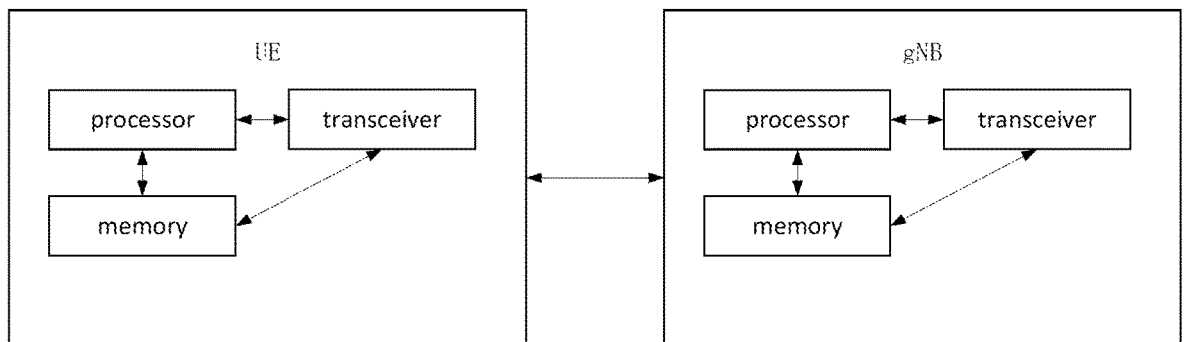
FIG. 9 is a schematic block diagram illustrating apparatuses according to one embodiment.

FIG. 9 is a schematic block diagram illustrating apparatuses according to one embodiment.

Referring to FIG. 9, the UE (i.e. remote unit, or terminal device) includes a processor, a memory, and a transceiver. The processor implements a function, a process, and/or a method which are proposed in FIG. 7.

The UE comprises a processor; and a transceiver coupled to the processor, wherein the processor is configured to: receive a paging for MT SDT from a network device via the transceiver; and determine whether to stop the MT SDT or not when UL data expected to be transmitted by an MO SDT arrives before the MT SDT completes. The MT SDT may be initiated for a DL data transmission from the network device to the UE.

The processor may be further configured to initiate a UL MO SDT for the UL data; and stop the MT SDT. Alternatively, the processor may be further configured to initiate a UL MO SDT for the UL data; and stop the MT SDT when the UL data is transmitted by the UL MO SDT.

In one embodiment, each of the MT SDT and the UL MO SDT is associated with a priority. The processor may be further configured to initiate a UL MO SDT for the UL data; and stop the MT SDT when the UL MO SDT has a higher priority than the MT SDT. Each of a priority of the MT SDT and a priority of the UL MO SDT may be determined by the priority of the traffic transmitted therein. Alternatively, each of a priority of the MT SDT and a priority of the UL MO SDT is determined by the highest priority among priorities of the logical channels that there are SDT data or SDT data arrival. The priority of the MT SDT may be indicated in a DL message. Preferably, the priority of the UL MO SDT is configured to be higher than the priority of the MT SDT.

In some embodiment, the processor may be further configured to initiate a Random Access Channel (RACH) for MT SDT; and set a resume cause to mo-SDT in Msg3 in the RACH for MT SDT. In some other embodiment, the processor may be further configured to, when CG-SDT has been configured, respond to the MT SDT by the CG-SDT. In still another embodiment, the processor may be further configured to transmit an indication of the arrival of the UL data via the transceiver.

Referring to FIG. 9, the gNB (i.e. base unit or network device) includes a processor, a memory, and a transceiver. The processors implement a function, a process, and/or a method which are proposed in FIG. 8.

The network device comprises a processor; and a transceiver coupled to the processor, wherein the processor is configured to: transmit a paging for MT SDT to a terminal device via the transceiver; and determine whether to stop the MT SDT or not before the MT SDT completes. The MT SDT may be initiated for a DL data transmission from the network device to the terminal device.

The processor may be further configured to stop the MT SDT when receiving an indication that an MO SDT is initiated. Alternatively, the processor may be further configured to stop the MT SDT when receiving UL data by an MO SDT.

In one embodiment, each of the MT SDT and an UL MO SDT is configured with a priority. Each of a priority of the MT SDT and a priority of the UL MO SDT is determined by the priority of the traffic transmitted therein. Alternatively, each of a priority of the MT SDT and a priority of the UL MO SDT is determined by the highest priority among priorities of the logical channels that there are SDT data or SDT data arrival. The priority of the MT SDT is indicated in a DL message. Preferably, the priority of the UL MO SDT is configured to be higher than the priority of the MT SDT.

In some embodiment, the processor may be further configured to receive a Msg3 in which a resume cause is set to mo-SDT via the transceiver. In some other embodiment, The processor may be further configured to receive an indication of arrival of UL data via the transceiver.

Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE) for wireless communication, comprising:
   at least one memory; and
   at least one processor coupled with the at least one memory and configured to cause the UE to:
   receive a paging for Mobile Terminating (MT) Small Data Transmission (SDT) from a network device, wherein the UE is in a non-Radio Resource Control RRC) _CONNECTED state with the network device; and
   determine whether to stop the MT SDT or not when uplink (UL) data expected to be transmitted by a Mobile Originating (MO) SDT arrives before the MT SDT completes,
   wherein the MT SDT and the UL MO SDT are associated with a priority.

2. The UE of claim 1, wherein the at least one processor is further configured to cause the UE to:
   initiate a UL MO SDT for the UL data; and
   stop the MT SDT.

3. The UE of claim 1, wherein the at least one processor is further configured to cause the UE to:
   initiate a UL MO SDT for the UL data; and
   stop the MT SDT when the UL data is transmitted by the UL MO SDT.

4. The UE of claim 1, wherein the at least one processor is further configured to cause the UE to:
   initiate a UL MO SDT for the UL data; and
   stop the MT SDT when the UL MO SDT has a higher priority than the MT SDT.

5. The UE of claim 1, wherein each of the priority of the MT SDT and the priority of the UL MO SDT is determined by a priority of traffic transmitted therein.

6. The UE of claim 1, wherein each of the priority of the MT SDT and the priority of the UL MO SDT is determined by a highest priority among priorities of logical channels associated with SDT data or SDT data arrival.

7. The UE of claim 1, wherein the priority of the MT SDT is indicated in a DL message.

8. The UE of claim 1, wherein the priority of the UL MO SDT is configured to be higher than the priority of the MT SDT.

9. The UE of claim 1, wherein the at least one processor is further configured to cause the UE to:
   initiate a Random Access Channel (RACH) for MT SDT; and set a resume cause to mobile originate (mo)-SDT in Msg3 in the RACH for MT SDT.

10. The UE of claim 1, wherein the at least one processor is further configured to cause the UE to:
   when configured grant-based SDT (CG-SDT) has been configured, respond to the MT SDT by the CG-SDT.

11. The UE of claim 1, wherein the at least one processor is further configured to cause the UE to:
   transmit an indication of arrival of the UL data.

12. A processor for wireless communication, comprising:
   at least one controller coupled with at least one memory and configured to cause the processor to:
   receive a paging for Mobile Terminating (MT) Small Data Transmission (SDT) from a network device, wherein the UE is in a non-Radio Resource Control RRC) _CONNECTED state with the network device; and
   determine whether to stop the MT SDT or not when uplink (UL) data expected to be transmitted by a Mobile Originating (MO) SDT arrives before the MT SDT completes,
   wherein the MT SDT and the UL MO SDT are associated with a priority.

13. The processor of claim 12, wherein the at least one controller is further configured to cause the processor to:
   initiate a UL MO SDT for the UL data; and
   stop the MT SDT.

14. The processor of claim 12, wherein the at least one controller is further configured to cause the processor to:
   initiate a UL MO SDT for the UL data; and
   stop the MT SDT when the UL data is transmitted by the UL MO SDT.

15. The processor of claim 12, wherein the at least one controller is further configured to cause the processor to:
   when configured grant-based SDT (CG-SDT) has been configured, respond to the MT SDT by the CG-SDT.

16. The processor of claim 12, wherein the at least one controller is further configured to cause the processor to:
   transmit an indication of arrival of the UL data.

17. A method performed by a user equipment (UE), the method comprising:
   receiving a paging for Mobile Terminating (MT) Small Data Transmission (SDT) from a network device when the UE is in a non-Radio Resource Control (RRC) _CONNECTED state with the network device; and
   determining whether to stop the MT SDT or not when uplink (UL) data expected to be transmitted by a Mobile Originating (MO) SDT arrives before the MT SDT completes,
   wherein the MT SDT and the UL MO SDT are associated with a priority.

18. A user equipment (UE) for wireless communication, comprising:
   at least one memory; and
   at least one processor coupled with the at least one memory and configured to cause the UE to:
   receive a paging for Mobile Terminating (MT) Small Data Transmission (SDT), wherein the UE is in a non-Radio Resource Control (RRC)_CONNECTED state; and
   stop the MT SDT when uplink (UL) data expected to be transmitted by a Mobile Originating (MO) SDT arrives before the MT SDT completes,
   wherein the MT SDT and the UL MO SDT are associated with a priority.

19. The UE of claim 18, wherein each of the priority of the MT SDT and the priority of the UL MO SDT is determined by a priority of traffic transmitted therein.

20. The UE of claim 18, wherein each of the priority of the MT SDT and the priority of the UL MO SDT is determined by a highest priority among priorities of logical channels associated with SDT data or SDT data arrival.

* * * * *